US010801469B2

(12) United States Patent
Hancock et al.

(10) Patent No.: US 10,801,469 B2
(45) Date of Patent: Oct. 13, 2020

(54) WIND BLADE JOINTS WITH FLOATING CONNECTORS

(71) Applicant: General Electric Company, Schenectady, NY (US)

(72) Inventors: Mark Hancock, Southampton (GB); Andrea Giuseppe Avaldi, Southampton (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/805,494

(22) Filed: Nov. 7, 2017

(65) Prior Publication Data
US 2019/0136828 A1 May 9, 2019

(51) Int. Cl.
F03D 1/06 (2006.01)

(52) U.S. Cl.
CPC ......... *F03D 1/0675* (2013.01); *F03D 1/0633* (2013.01); *F05B 2240/302* (2013.01)

(58) Field of Classification Search
CPC ...... F03D 1/0633; F03D 1/0675; F03D 1/065; F03D 7/0296; F03D 13/10; F05B 2240/302
USPC ...................................................... 416/132 B
See application file for complete search history.

(56) References Cited

U.S. PATENT DOCUMENTS

| | | | | |
|---|---|---|---|---|
| 3,216,198 | A | * | 11/1965 | Brooks .................. B60T 11/26 60/587 |
| 4,749,029 | A | * | 6/1988 | Becker ................... F23R 3/002 165/169 |
| 7,997,874 | B2 | | 8/2011 | van der Bos |
| 8,128,032 | B2 | * | 3/2012 | Pajard ...................... B64C 3/56 244/124 |
| 8,177,514 | B2 | | 5/2012 | Hibbard |
| 8,328,516 | B2 | | 12/2012 | Santiago et al. |
| 2004/0250549 | A1 | * | 12/2004 | Liebe ..................... F23R 3/002 60/804 |

(Continued)

FOREIGN PATENT DOCUMENTS

| | | |
|---|---|---|
| EP | 3144526 A1 | 3/2017 |
| JP | 2004011616 A | 1/2004 |
| KR | 10 1627655 B1 | 6/2016 |

OTHER PUBLICATIONS

U.S. Appl. No. 15/602,698, filed May 23, 2017.

(Continued)

*Primary Examiner* — Erick R Solis
*Assistant Examiner* — Robert A Werner
(74) *Attorney, Agent, or Firm* — Dority & Manning, P.A.

(57) ABSTRACT

A rotor blade assembly for a wind turbine is disclosed with a first blade segment having a female structural member defining an internal cavity, and a second blade segment connected to the first blade segment at a chord-wise extending joint. The second blade segment has a male structural member that is received within the internal cavity of the female structural member of the first blade segment. At least one floating connector, for joining the first and second blade segments, is positioned in at least one of a generally chord-wise direction and a generally span-wise direction. The floating connector has a biasing element configured to restrain bi-directional movement of a floating pin within the floating connector.

19 Claims, 16 Drawing Sheets

(56) References Cited

U.S. PATENT DOCUMENTS

| | | | |
|---|---|---|---|
| 2011/0020126 A1* | 1/2011 | Glenn | F03D 1/0675 |
| | | | 416/223 A |
| 2011/0081247 A1 | 4/2011 | Hibbard | |
| 2011/0091326 A1* | 4/2011 | Hancock | F03D 1/0675 |
| | | | 416/225 |
| 2011/0158788 A1* | 6/2011 | Bech | F03D 1/0675 |
| | | | 415/1 |
| 2012/0269643 A1* | 10/2012 | Hibbard | F03D 1/0675 |
| | | | 416/226 |
| 2013/0236321 A1 | 9/2013 | Oltoff | |
| 2013/0302144 A1* | 11/2013 | Demtroder | H02K 7/1838 |
| | | | 415/124.2 |
| 2015/0240780 A1* | 8/2015 | Leonard | F03D 1/0675 |
| | | | 416/204 R |
| 2015/0292477 A1* | 10/2015 | Kratmann | F03D 1/0633 |
| | | | 416/229 R |
| 2015/0369211 A1* | 12/2015 | Merzhaeuser | F03D 1/0675 |
| | | | 416/61 |
| 2016/0290318 A1* | 10/2016 | Muik | F03D 7/0244 |

OTHER PUBLICATIONS

Peeters, et al., The Concept of Segmented Wind Turbine Blades: A Review, MDPI, Energies 2017, vol. 10, Issue 8, 1112, 20 pages http://dx.doi.org/10.3390/en10081112, http://www.mdpi.com/1996-1073/10/8/1112.

International Search Report, dated Mar. 11, 2019 for International Application No. PCT/US2018/059575.

* cited by examiner

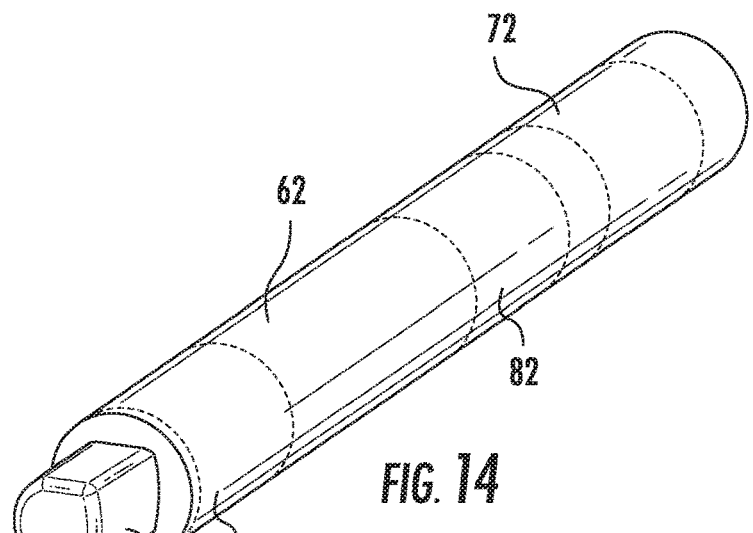
FIG. 14
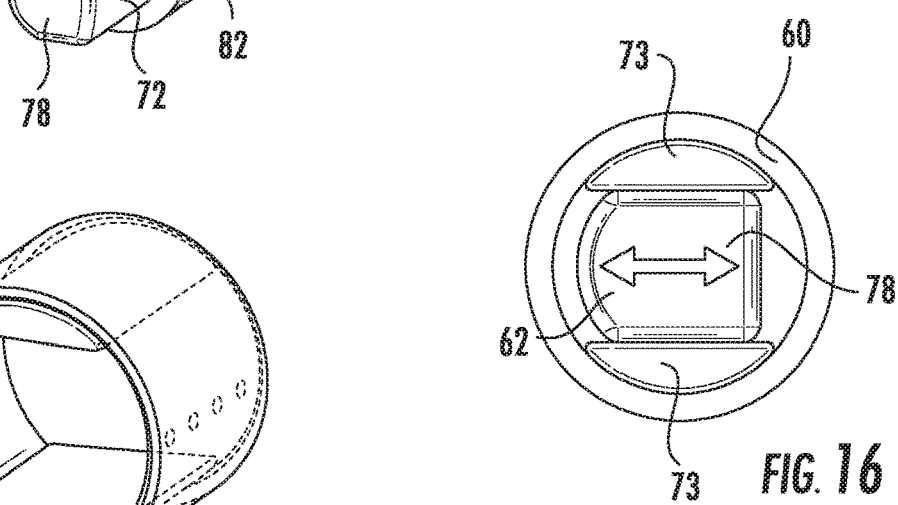
FIG. 15
FIG. 16
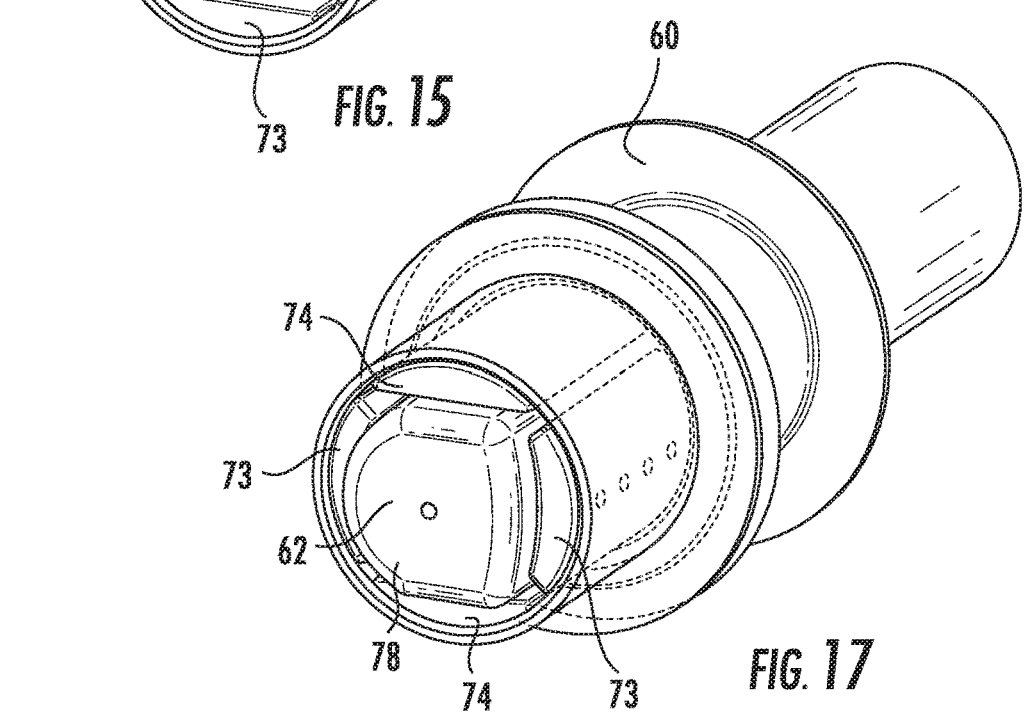
FIG. 17

WIND BLADE JOINTS WITH FLOATING CONNECTORS

FIELD OF THE INVENTION

The present subject matter relates generally to wind turbines and, more particularly, to methods and assemblies for mechanically joining multiple wind turbine blade segments of a rotor blade using cross pins and radial pins with floating support.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades using segmented or modular blades and advanced single piece blades. However, as is generally known, the deflection of a rotor blade is a function of blade length, along with wind speed, turbine operating states and blade stiffness. Thus, longer rotor blades may be subject to increased forces, particularly when a wind turbine is operating in high-speed wind conditions. These increased deflection forces not only produce fatigue on the rotor blades and other wind turbine components but may also increase the risk of the rotor blades striking the tower.

Another modification has been to alter the configuration of the tip of the rotor blade. In particular, blade tips may be specifically designed to enhance or improve various aspects of a rotor blade's performance. For example, certain blade tips may be designed to operate efficiently in specific wind classes. Additionally, blade tips may be configured to enhance specific operating conditions of the wind turbine, such as by being configured to lower torque, reduce noise, or capture the maximum possible energy.

Different techniques of joining rotor blade tips and segments with mechanical fasteners in a transverse direction have been considered, such as joining by riveting, transversely bolting overlapping plates to the blade segments, using fiber metal laminate (FML) in the region of the joint, and using lugs to connect the spars of adjacent segments. Some techniques over constrain the dynamics of the blade and cause stress concentrations at the joint. It would be advantageous to have a mechanical joint designed for multiple blade segments that allowed for the quick and efficient assembly and disassembly of blade segments while avoiding high stresses in the edgewise bending direction.

BRIEF DESCRIPTION OF THE INVENTION

Aspects and advantages of the invention will be set forth in part in the following description, or may be obvious from the description, or may be learned through practice of the invention.

In one aspect, a rotor blade assembly for a wind turbine has a first blade segment having a female structural member defining an internal cavity, and a second blade segment connected to the first blade segment at a chord-wise extending joint. The second blade segment has a male structural member that is received within the internal cavity of the female structural member of the first blade segment. At least one floating connector, for joining the first and second blade segments, is positioned in at least one of a generally chord-wise direction and a generally span-wise direction. The floating connector has a biasing element configured to restrain bi-directional movement of a floating pin within the floating connector.

In another aspect, a floating connector for a rotor blade assembly has a plurality of bushings attached to a first blade segment and a second blade segment, the plurality of bushings having at least one set of aligned bore holes extending through a passageway in a chord-wise extending joint. The floating connector has at least one floating pin removably seated through the at least one set of aligned bore holes, the at least one floating pin configured for only bi-directional movement, in a single preselected plane, within at least one bushing of the plurality of bushings.

In a further aspect, a method of connecting two adjoining blade segments has the steps of inserting a second blade segment having a male structural member into a first blade segment having a female structural member at a chord-wise extending joint; then aligning a plurality of bushings attached to the first blade segment and the second blade segment, the plurality of bushings having at least one set of aligned bore holes extending through a passageway in the chord-wise extending joint in at least one of a generally chord-wise direction and a generally span-wise direction; then removably seating at least one floating pin through the at least one set of aligned bore holes to configure at least one floating connector, the at least one floating pin configured for only bi-directional movement, in a single preselected plane, within at least one bushing of the plurality of bushings; then installing at least one biasing element configured to restrain bi-directional movement of the at least one floating pin within the at least one floating connector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 14-17 illustrate an embodiment of a floating pin positioned in a bushing housing;

Figure 1:
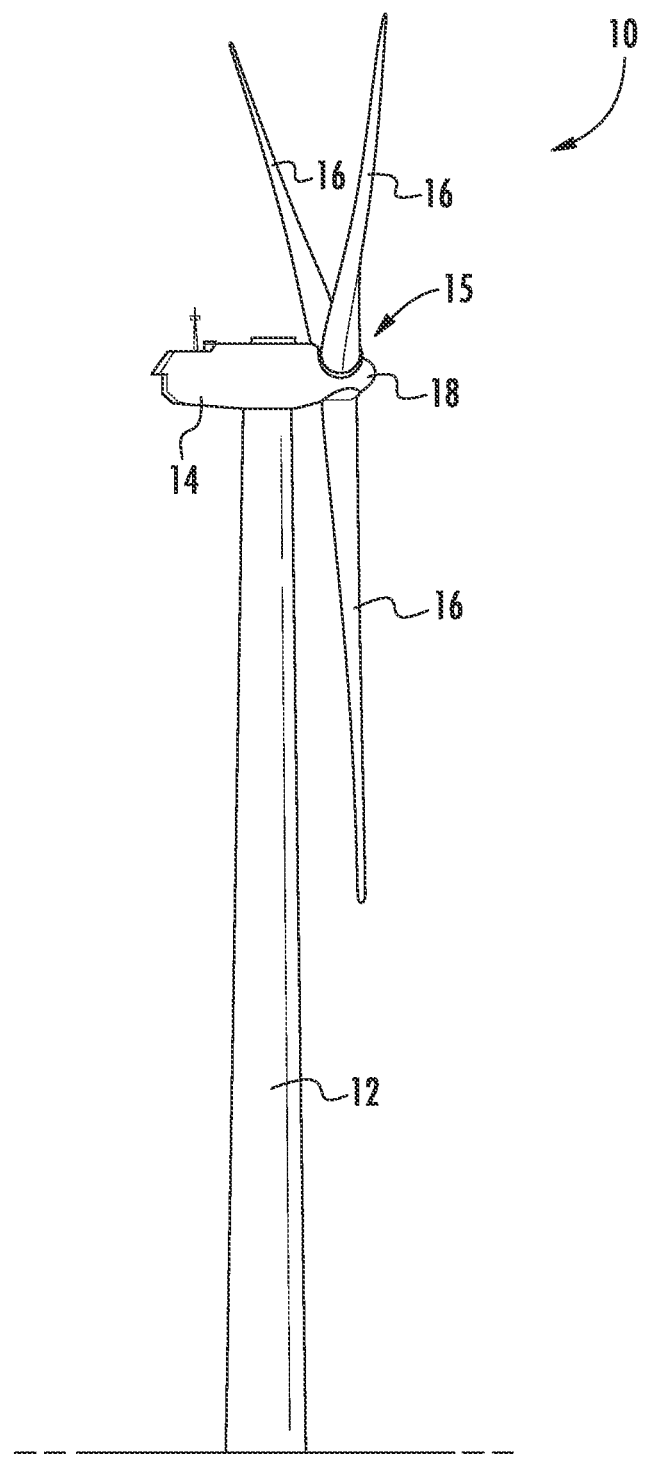
FIG. 1 illustrates a perspective view of one embodiment of a wind turbine.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, and as illustrated in FIGS. 1-4, the present subject matter is directed to a wind turbine blade 16 with a chord-wise extending joint 25 linking a first blade segment 22 with a second blade segment 24 which can be restrained by one or more floating connectors 60 with removable floating pins 62, the removal of which allows assembly and disassembly of the chord-wise extending joint 25. One or more seatings of the floating pins 62 allows for only bi-directional movement, in a single preselected plane, within at least one bushing of the plurality of bushings. The movement direction can be either a generally flap-wise direction (also referred to as X-direction), a generally chord-wise direction (also referred to as Y-direction, or edgewise direction), or a generally span-wise direction (also referred to as Z-direction, axial direction, or radial direction). Movement of the floating pin 62 reduces internal structural loads on the rotor blade assembly 20 and increases manufacturing tolerances of the rotor blade assembly 20. Axial (span-wise) structural loads on the rotor blade assembly 20 from centrifugal acceleration and gravity can be restrained by a biasing element 64 either integrated with the floating pin 62, or extending between the first and second blade segments 22, 24. The pins in a conventional fixed pin/bush connected blade joint can be over-constrained when loaded in the edgewise bending direction. This leads to higher blade material costs and can limit the length of blade segment which can be supported at the joint. A floating connector 60 can relieve structural loading at the joint.

Referring now to the drawings, FIG. 1 illustrates perspective view of a wind turbine 10 of conventional construction. The wind turbine 10 includes a tower 12 with a nacelle 14 mounted thereon and a rotor 15. The rotor 15 includes a rotatable hub 18 having a plurality of rotor blades 16 mounted thereon, which is, in turn, connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
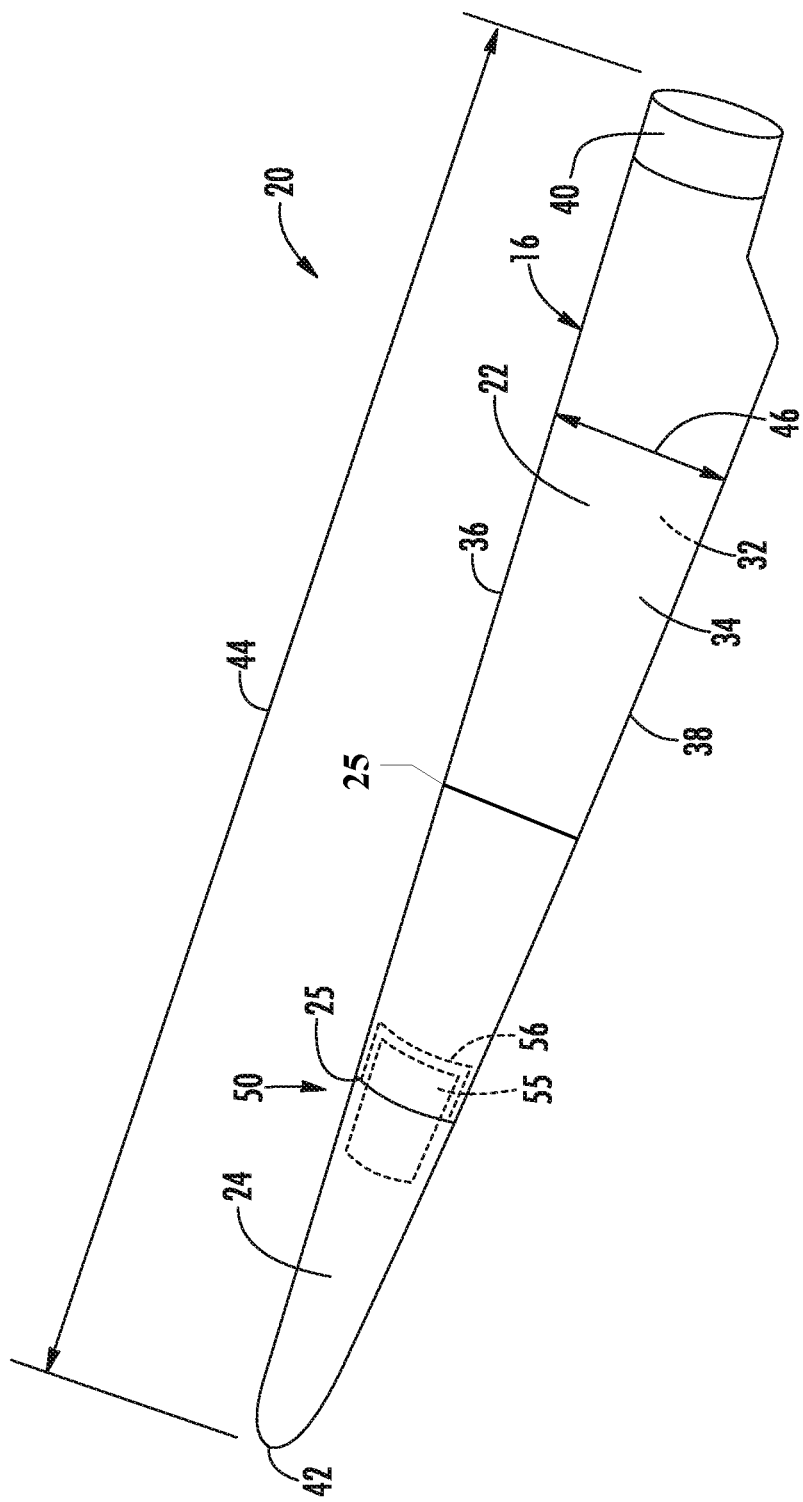
FIG. 2 illustrates a perspective view of one embodiment of one of the rotor blades of the wind turbine shown in FIG. 1.

Referring now to FIG. 2, a perspective view of the rotor blade 16 in accordance with aspects of the present subject matter is illustrated. As shown, the rotor blade 16 may generally include a suction side 34 and a pressure side 32 (FIG. 3) extending between a leading edge 36 and a trailing edge 38. Additionally, the rotor blade 16 may include a root end 40 configured to be mounted to the hub 18 (FIG. 1) of a wind turbine 10 and tip end 42 disposed opposite the root end 40. Further, the rotor blade 16 may have a span 44 defining the total length between the root end 40 and the tip end 42 and a chord 46 defining the total length between the leading edge 36 and the trailing edge 38. As is generally understood, the chord 46 may generally vary in length with respect to the span 44 as the rotor blade extends from the blade root 40 to the blade tip 42.

Additionally, the rotor blade 16 can include a plurality of blade segments 22, 24. For example, in the illustrated embodiment, the rotor blade 16 includes a first blade segment 22 connected to a second blade segment 24 at a chord-wise extending joint 25. It should be appreciated that, although the rotor blade assembly 20 of the present subject matter is illustrated and described herein as including two blade segments 22, 24, the rotor blade assembly 20 may generally comprise any number of blade segments configured as described and illustrated herein.

In several embodiments, the body of the rotor blade assembly 20 may be formed as a single, unitary component. Alternatively, the body may be formed from a plurality of shell components. For example, the body may be manufactured from a first shell half generally defining the pressure side 32 of the rotor blade assembly 20 and a second shell half generally defining the suction side 34 of the rotor blade assembly 20, with the shell halves being secured to one another at the leading and trailing edges 36, 38 of the blade assembly 20. Additionally, the body may generally be formed from any suitable material. For instance, in one embodiment, the body may be formed entirely from a laminate composite material, such as a carbon fiber reinforced laminate composite or a glass fiber reinforced laminate composite. Alternatively, one or more portions of the body may be configured as a layered construction and may include a core material 29 formed from a lightweight material such as wood (e.g., balsa), foam (e.g., extruded polystyrene foam) or a combination of such materials, disposed between layers of laminate composite material.

It should be appreciated that the chordwise extending joint 25 (FIG. 2) may generally be located at any suitable position along the span 44 of the rotor blade assembly 20. For example, in one embodiment, the distance of the joint 25 from the blade root 40 may range from about 40% to about 95% of the span 44, such as from about 40% to about 80% of the span 44 or from about 50% to about 65% of the span

44. However, it is foreseeable that, in other embodiments, the distance of the joint 25 from the blade root 40 may be less than 40% of the span 44 or greater than 95% of the span 44.

It should also be appreciated that, in alternative embodiments, the first and second blade segments 22, 24 need not be formed by cutting or otherwise dividing a pre-existing rotor blade assembly 20 into two separate blade sections. For example, in another embodiment, the first and second blade segments 22, 24 may be separately manufactured as modular blade segments and assembled together to form a modular rotor blade assembly 20.

Figure 3:
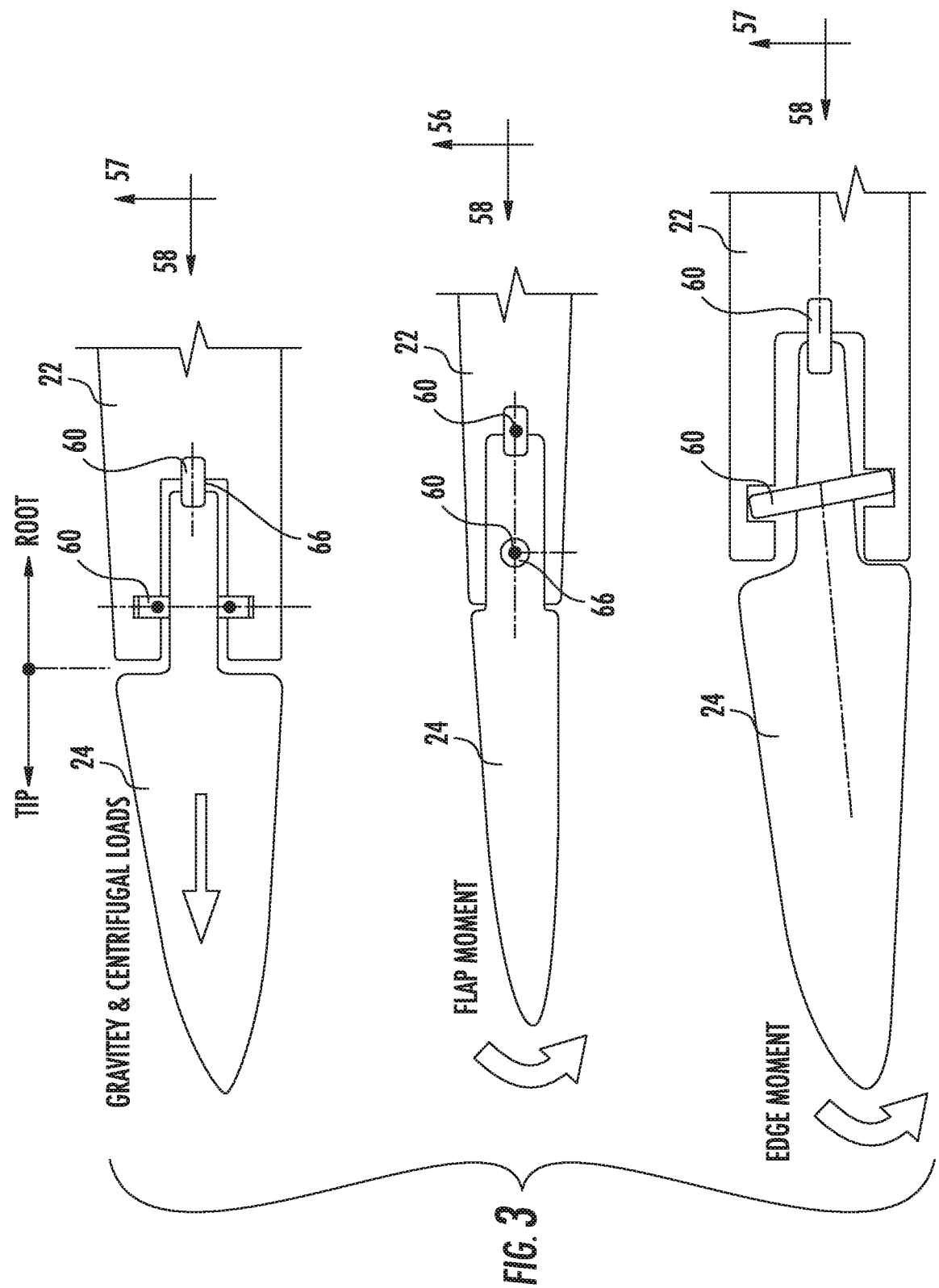
FIG. 3 illustrates a cross pin/radial pin combination embodiment of a rotor blade assembly.

In one embodiment of a rotor blade assembly 20, as illustrated in FIG. 3 and sometimes referred to as cross pin/radial pin combination, one floating connector 60 (cross pin) can be positioned in a generally chord-wise direction 57 with a second floating connector 60 (radial pin) positioned in a generally span-wise direction 58. A generally cylindrical floating pin 62 can be removably inserted in at least one bushing 66 which reacts to flap-wise loads without any chord-wise or flap-wise bi-directional movement but allows bi-directional movement along the preselected span-wise (axial) plane between the first and second blade segments 22, 24 to relieve high structural loads in the axial direction. This embodiment can avoid axial loads from edgewise bending. The floating pin 62 can pass through, for example, four bushings 66 aligned in a chord-wise direction 57 with two bushings 66 in the first (female) blade segment 22 and two in the second (male) blade segment 24. Note that floating connectors 60 can be used on either the first or second blade segment 22, 24 while a non-floating conventional fixed connector can be used on the opposing blade segment. In another embodiment, a floating connector 60 can be used on only one end of the floating pin 62 (cross pin) while the opposing end uses a conventional fixed connector. Using a single floating connector 60 in a cross pin, instead of one on each end, doubles the movement in the single floating connector 60 so all the centrifugal load is taken on one side, but still removes high loads due to over-constraint with edgewise loads. In all cases, the cylindrical bushing 66 is sufficiently narrow to allow relative movement of the blade segments 22, 24, including rotational movement of the blade segments.

Figure 4:
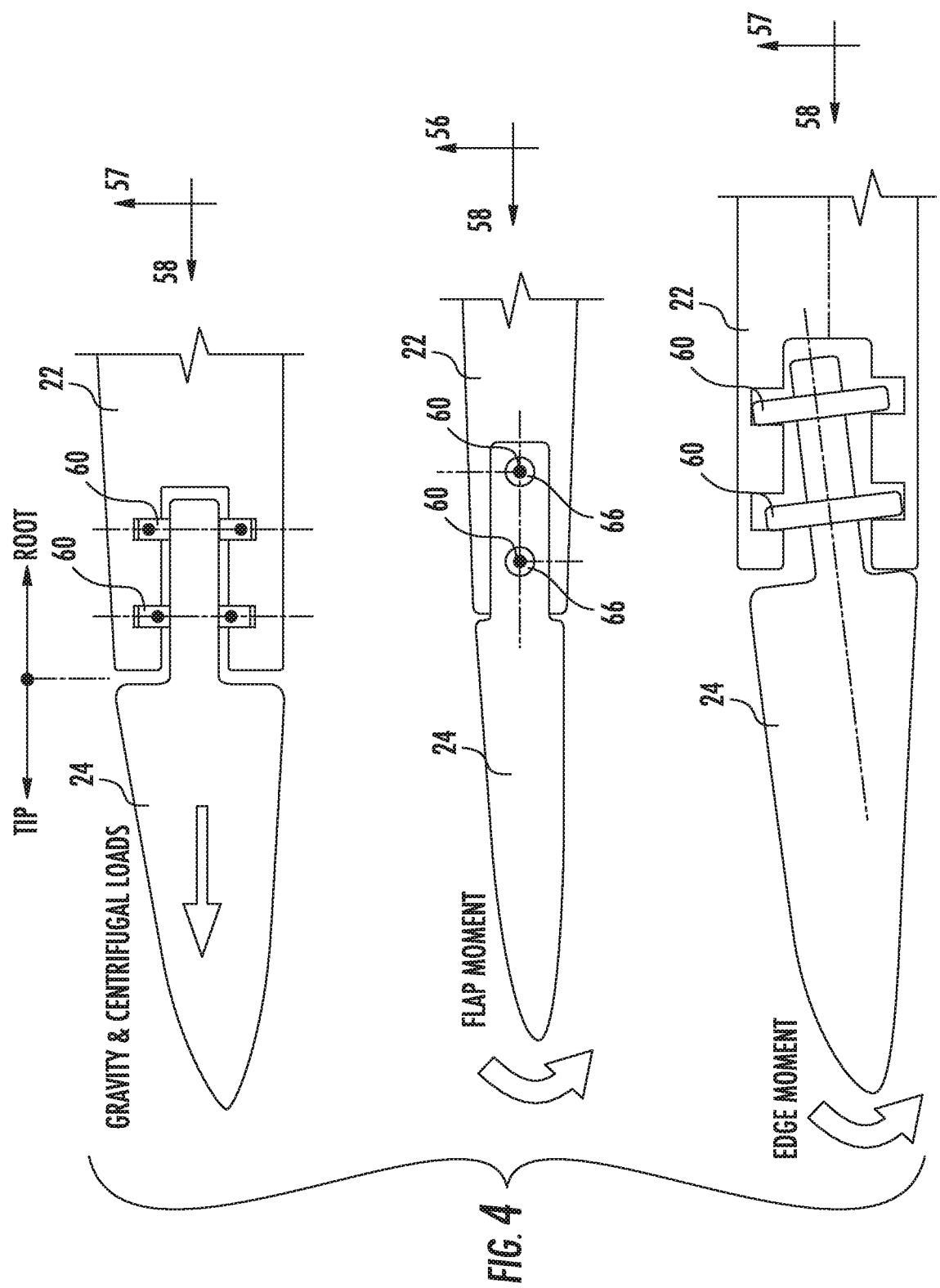
FIG. 4 illustrates a twin cross pin embodiment of a rotor blade assembly.

In another embodiment illustrated in FIG. 4, sometimes referred to as twin cross pins, two generally parallel floating connectors 60 can be spaced apart and positioned in a generally chord-wise direction 57, without using the span-wise floating connector 60 (radial pin) as seen in FIG. 3. In this embodiment, one or both of the connectors can be floating connectors 60 while the other remains a conventional fixed connector. Also, any number of floating connectors 60 in an aligned set of twin cross pin floating connectors 60 can be floating with the remaining ones in the aligned set being conventional fixed connectors.

Figure 5:
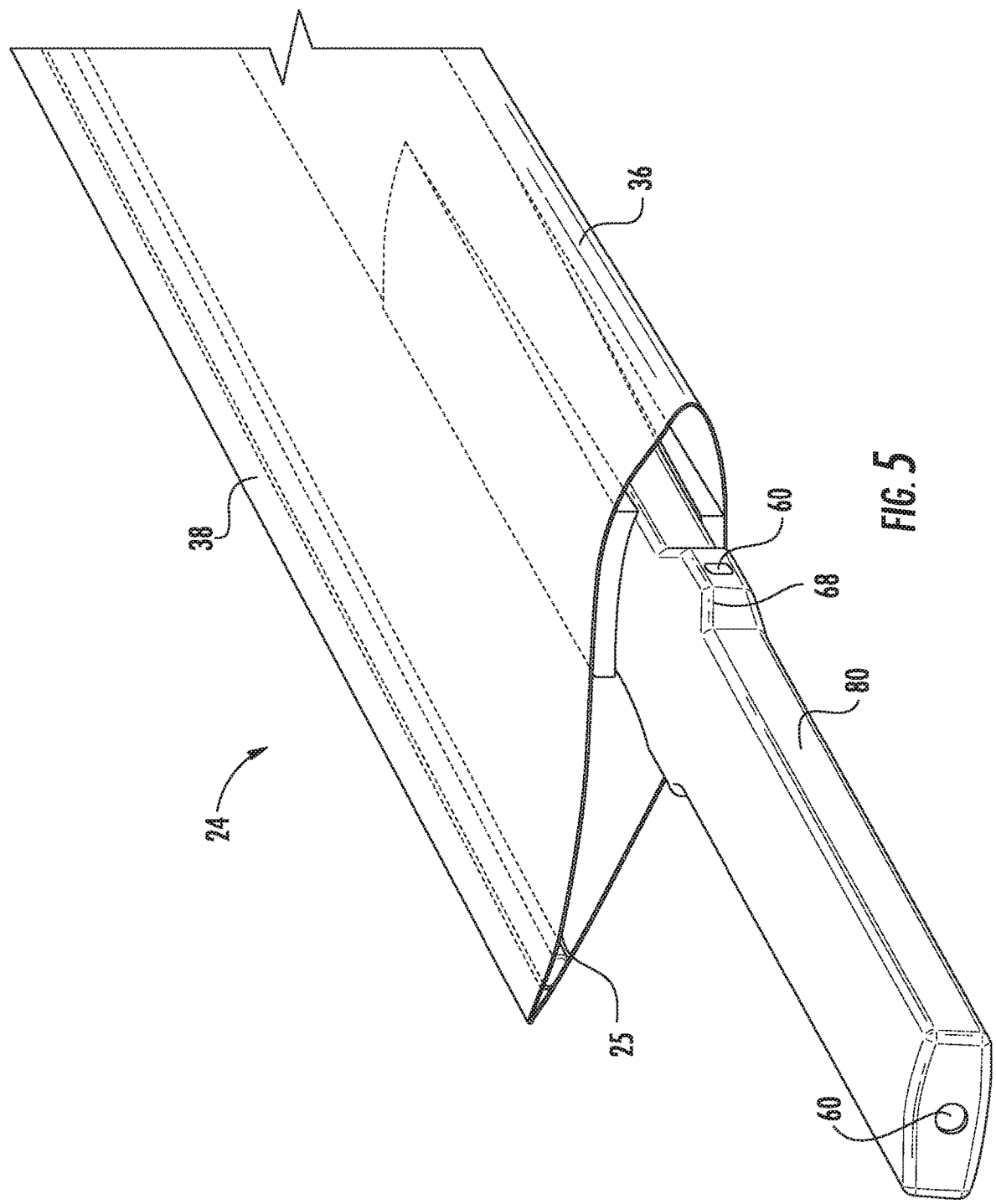
FIG. 5 illustrates an embodiment of a male structural member of a rotor blade assembly.
Figure 6:
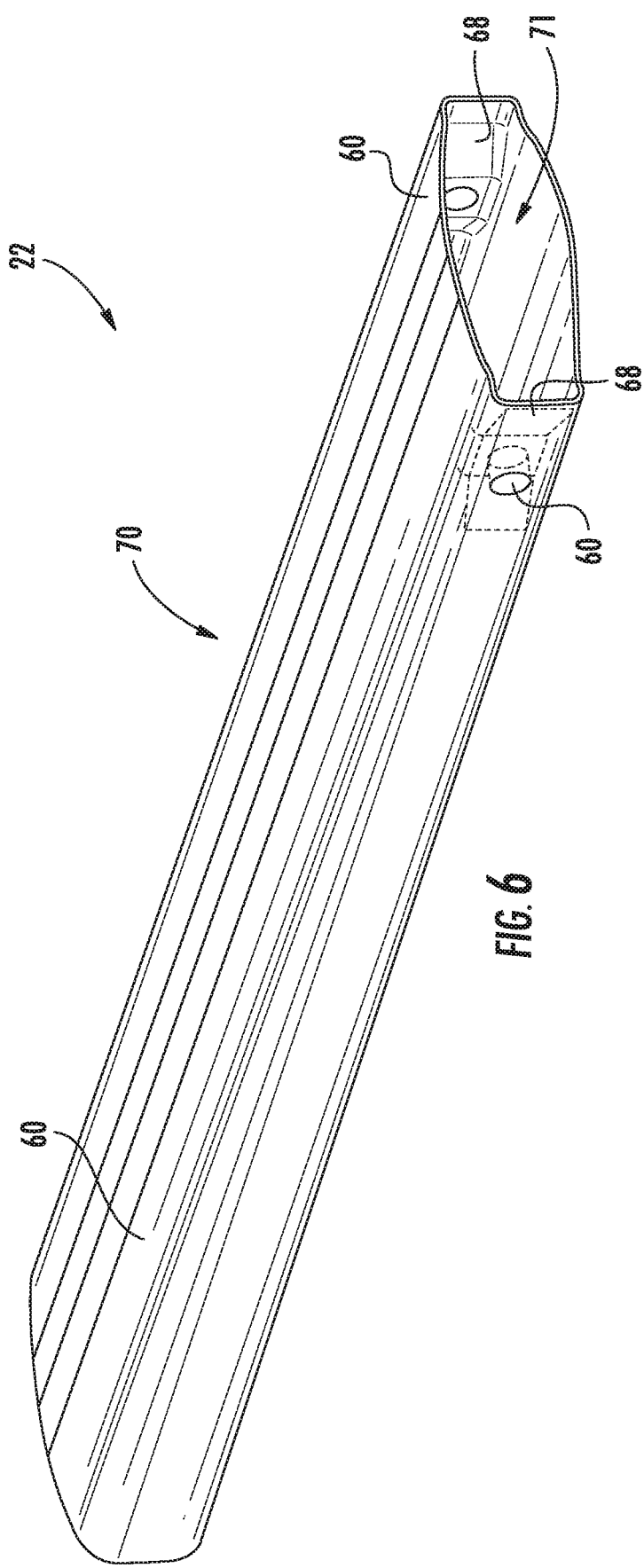
FIG. 6 illustrates an embodiment of a female structural member of a rotor blade assembly.
Figure 7:
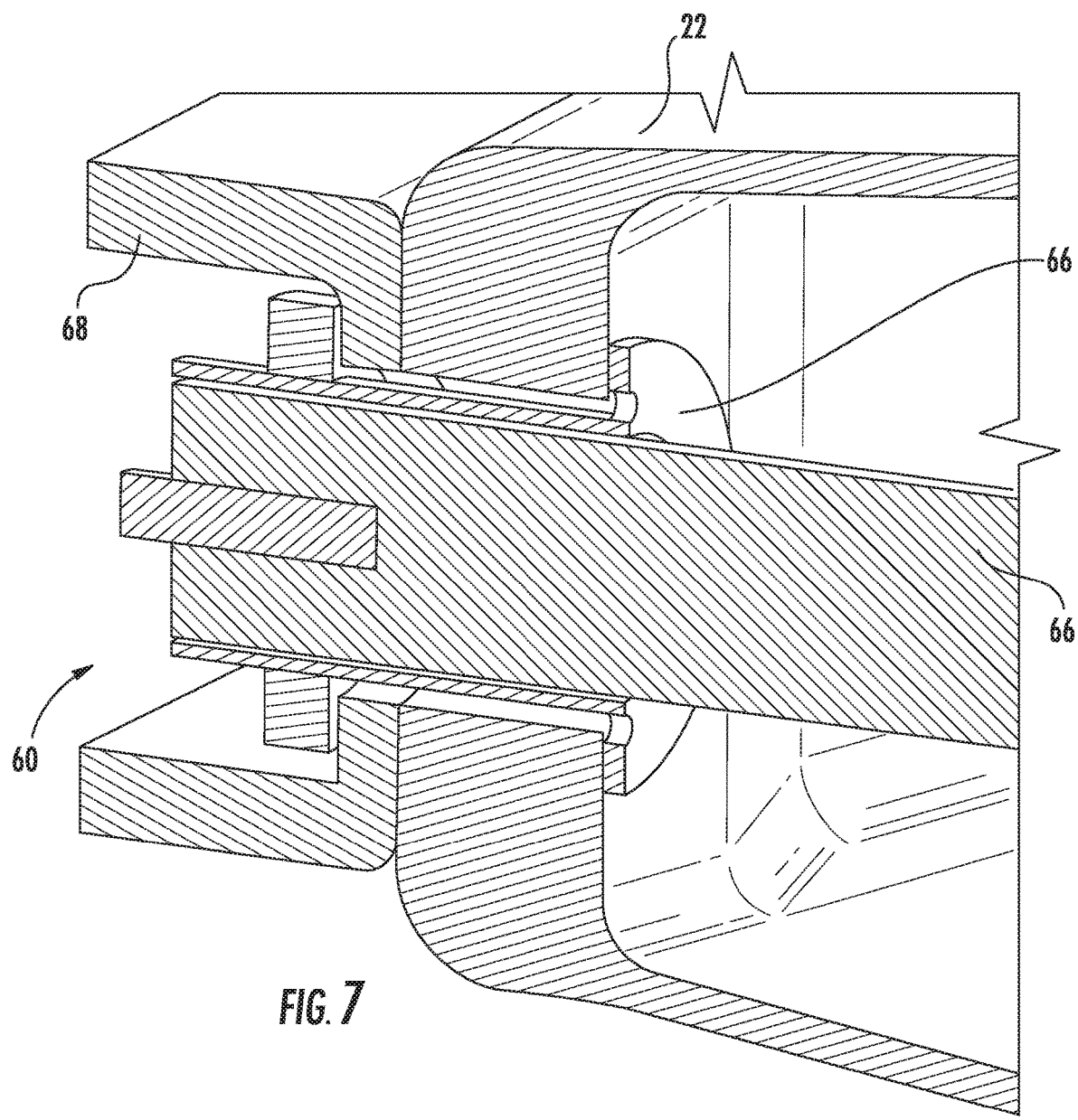
FIG. 7 illustrates an embodiment of a floating connector positioned as a cross pin on a female structural member.
Figure 8:
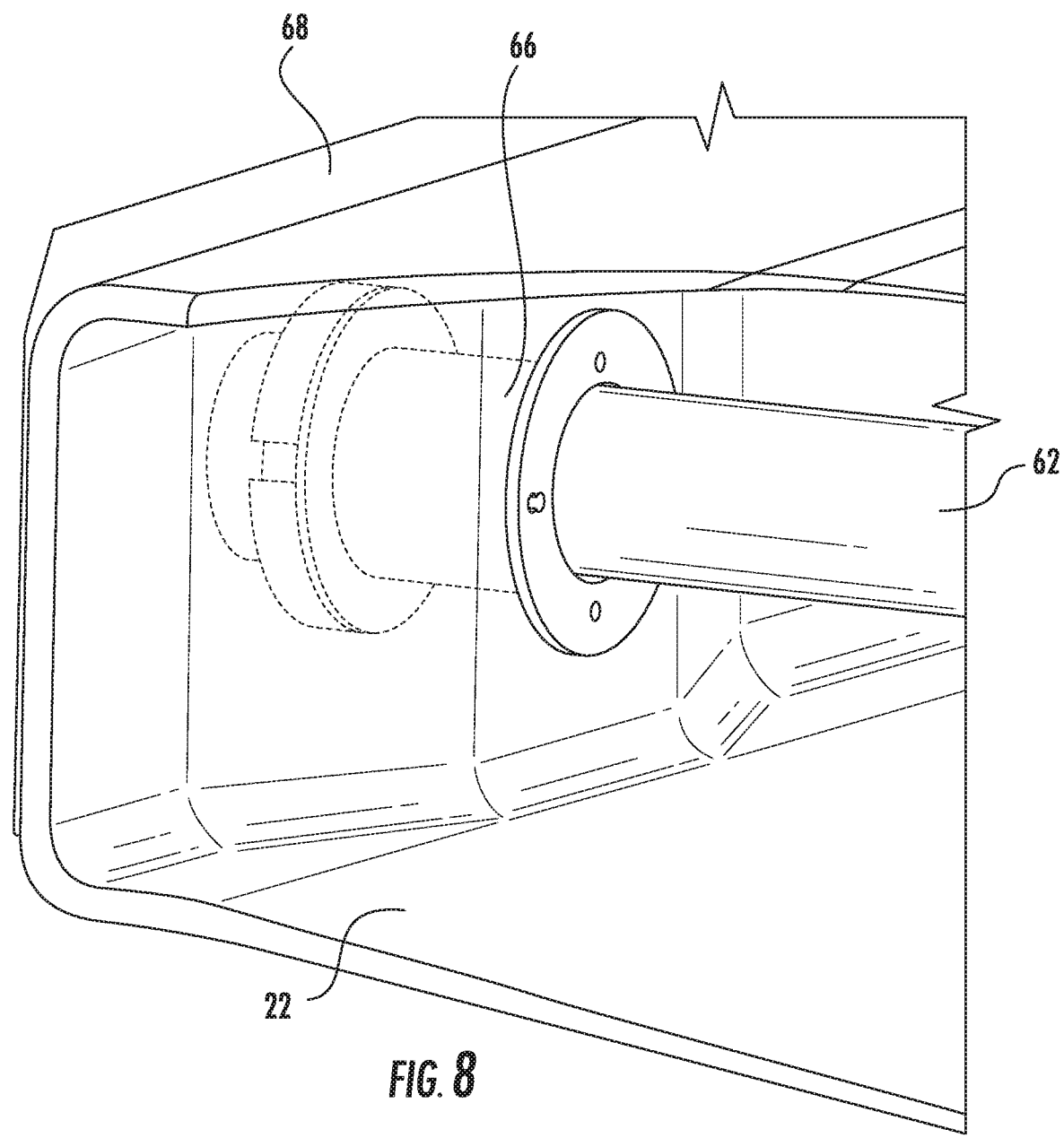
FIG. 8 illustrates another view of a floating connector positioned as a cross pin on a female structural member.
Figure 9:
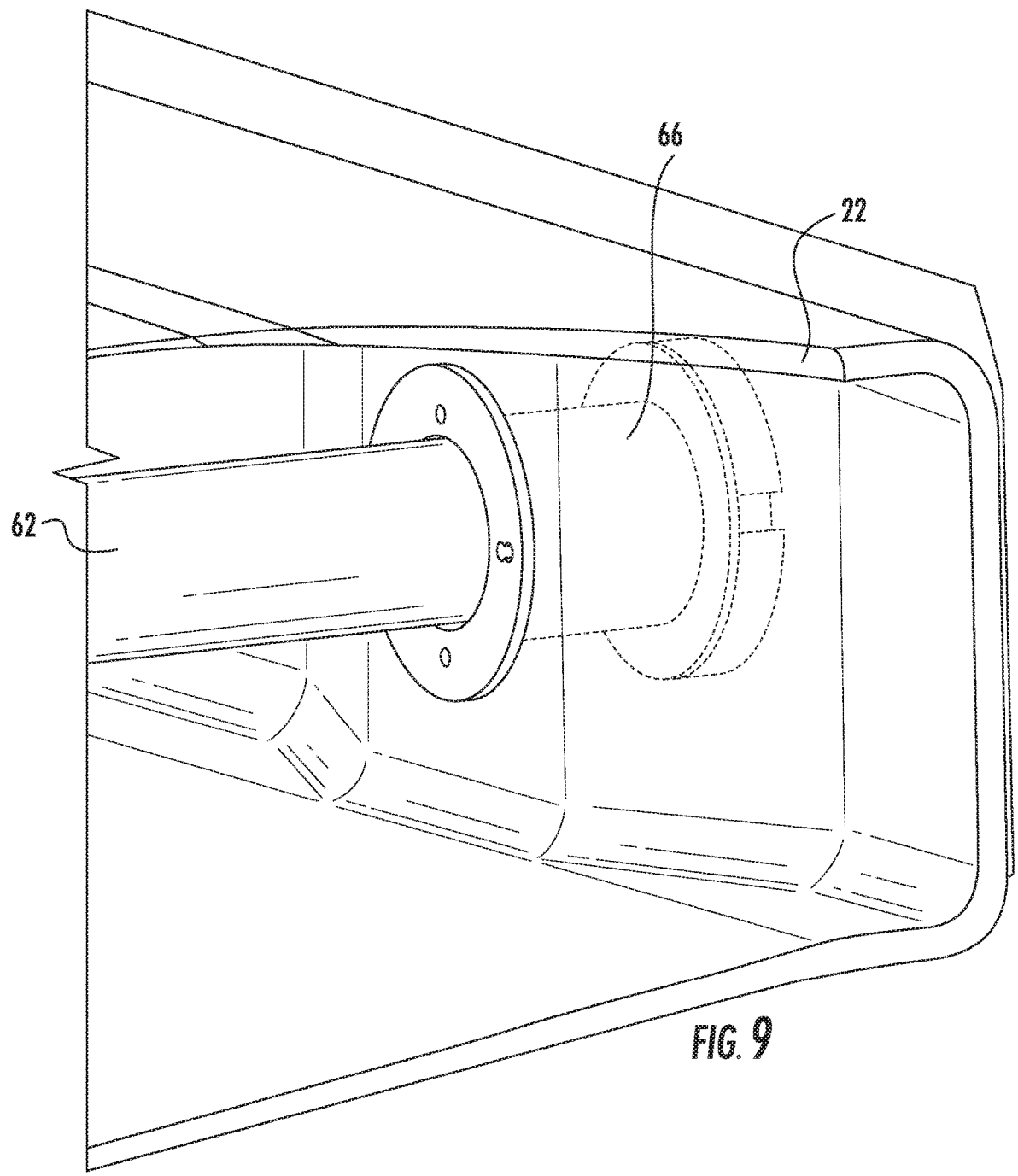
FIG. 9 illustrates yet another view of a floating connector positioned as a cross pin on a female structural member.
Figure 10:
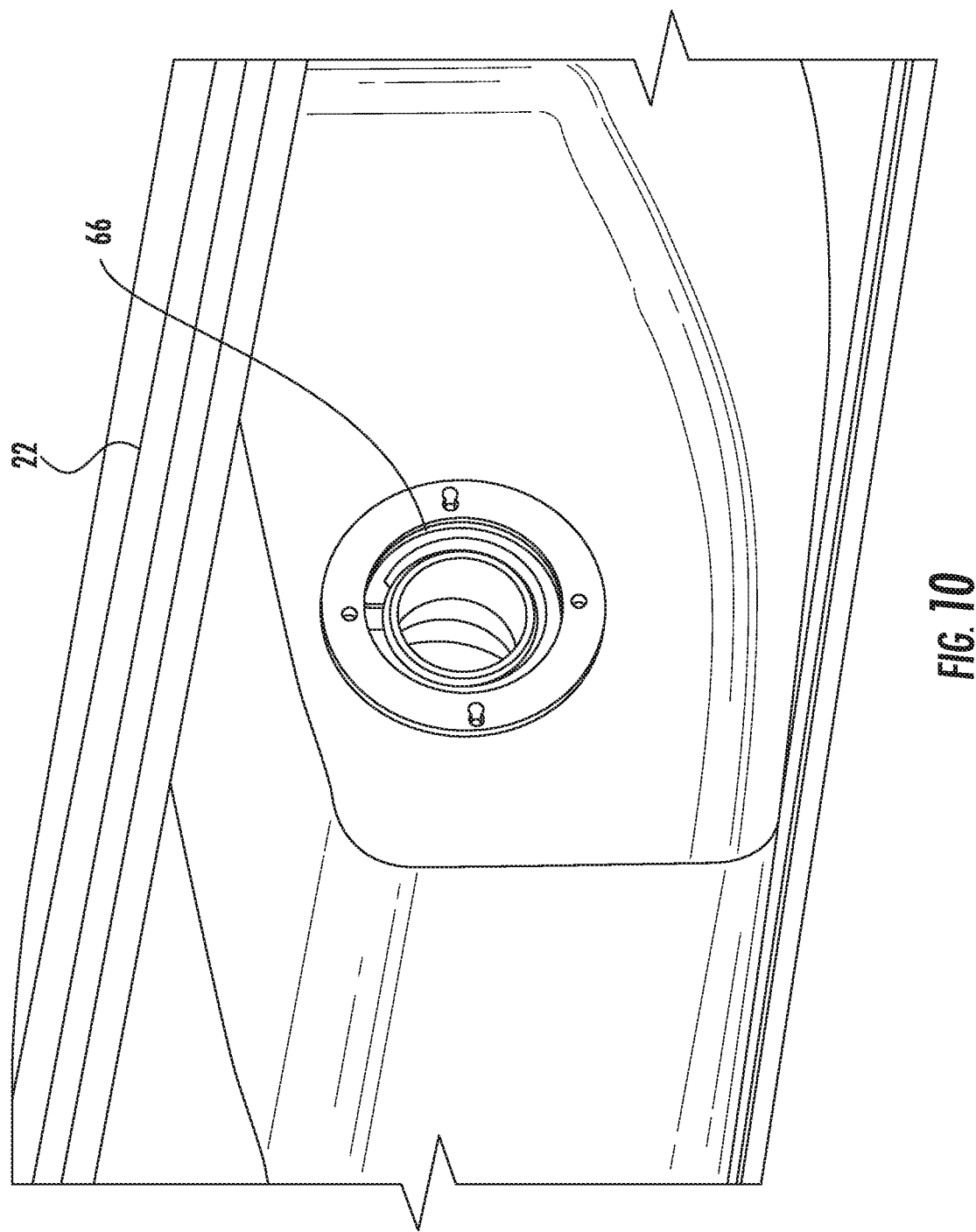
FIG. 10 illustrates a floating connector positioned as a radial pin on a female structural member.
Figure 11:
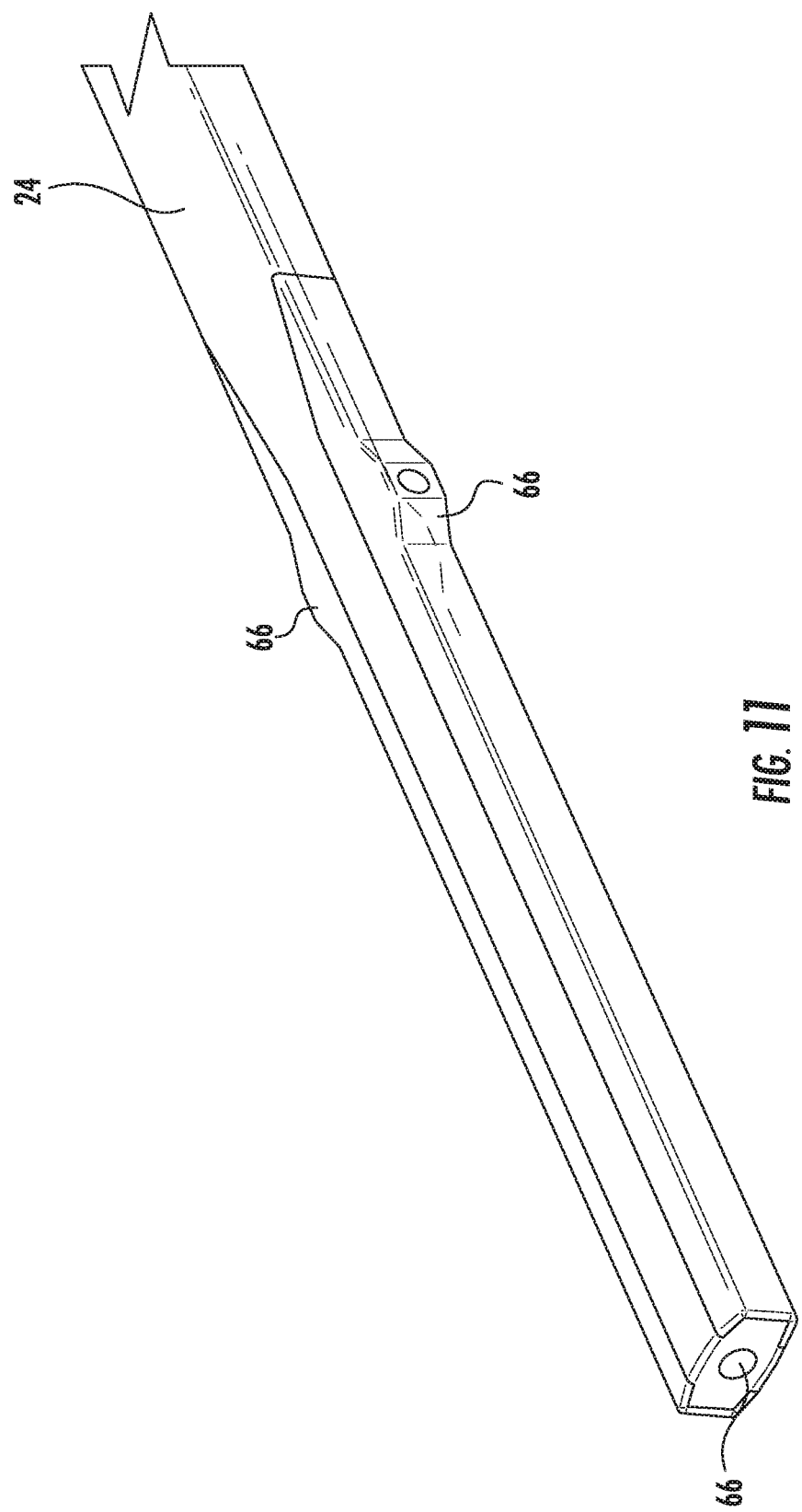
FIG. 11 illustrates an embodiment of a male structural member.
Figure 12:
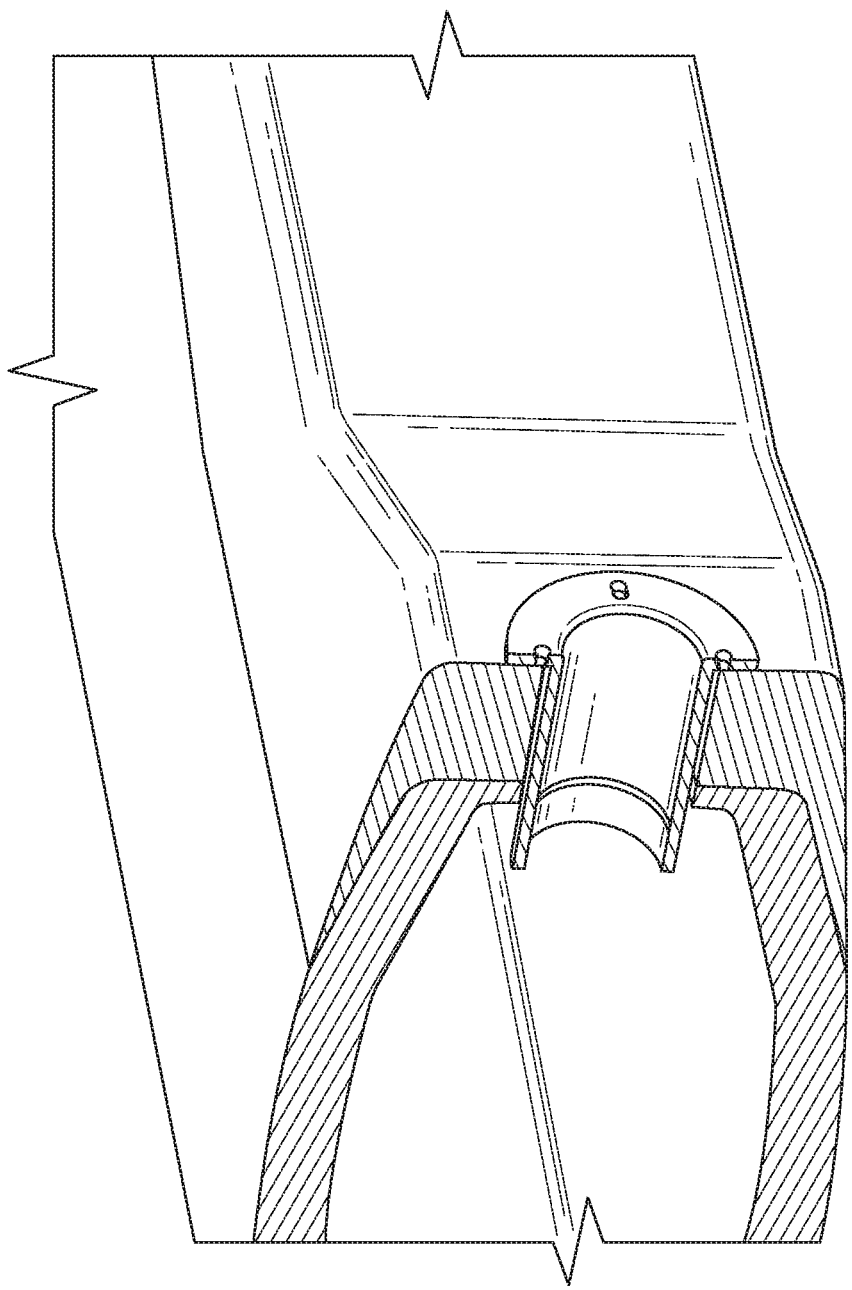
FIG. 12 illustrates an embodiment of a floating connector positioned as a cross pin on a male structural member.
Figure 13:
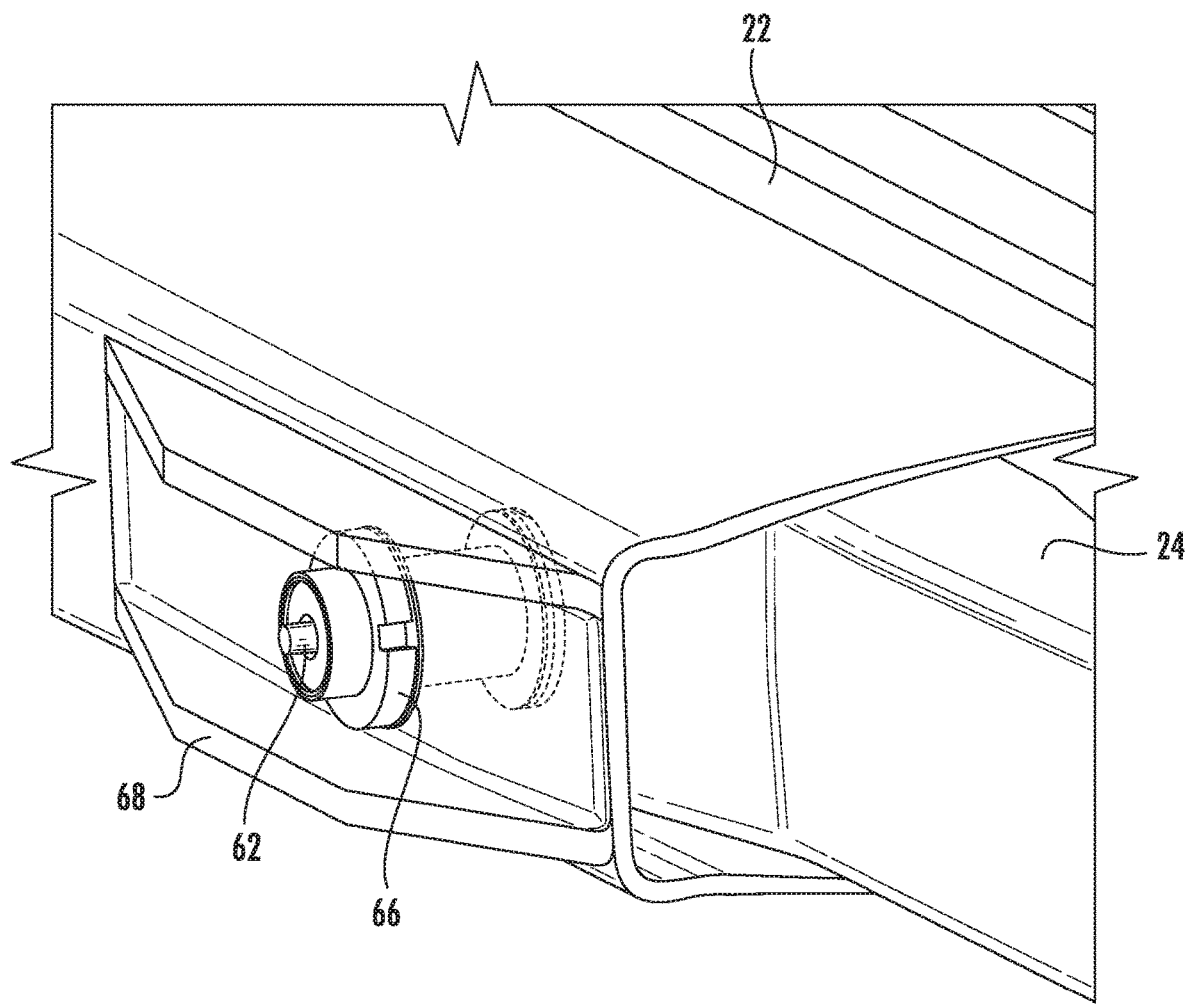
FIG. 13 illustrates as assembled male and female structural member with a floating connector positioned as a cross pin.
Figure 18:
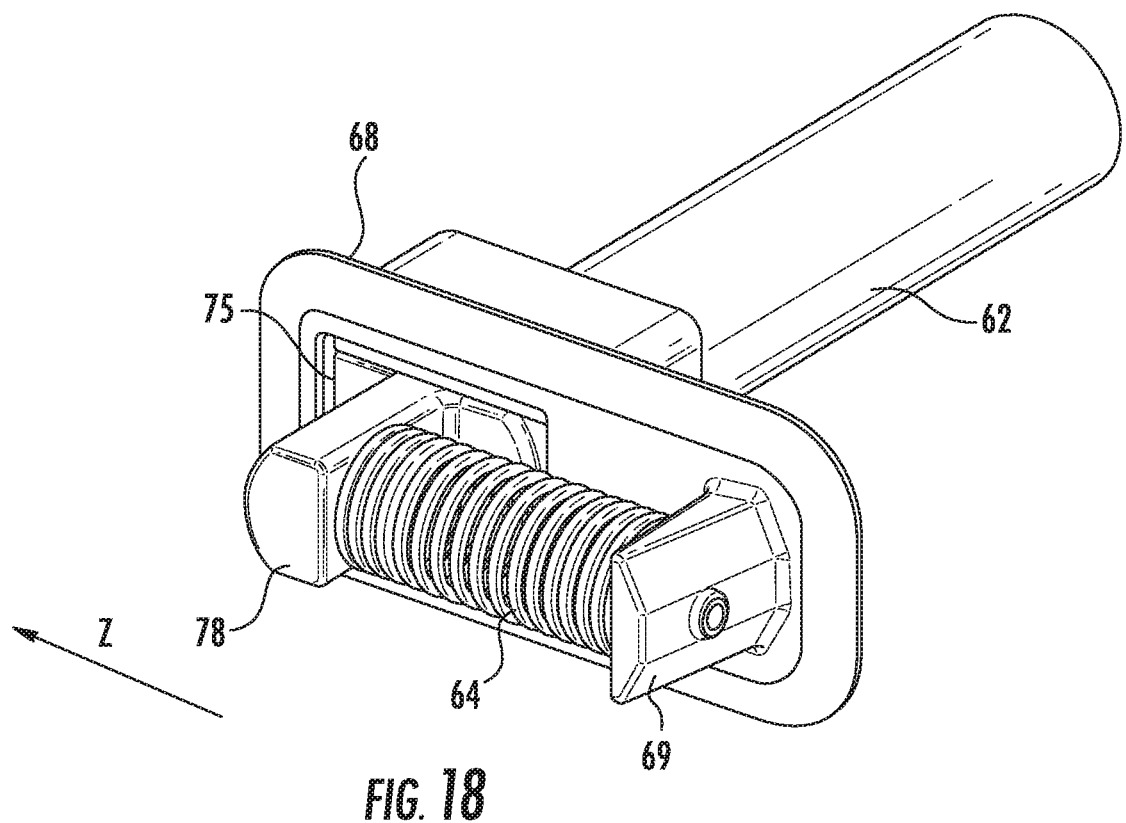
FIGS. 18-21 illustrate an embodiment of a floating pin in a bushing housing with a biasing element used for restraint.
Figure 19:
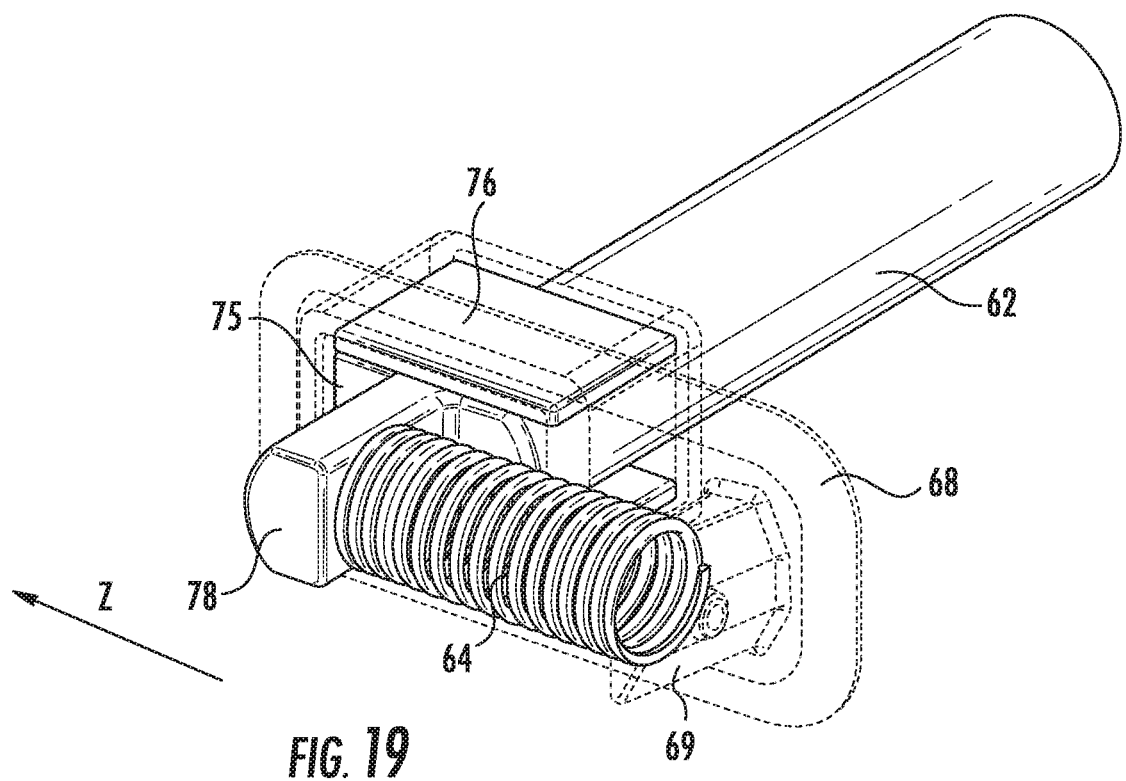
Figure 20:
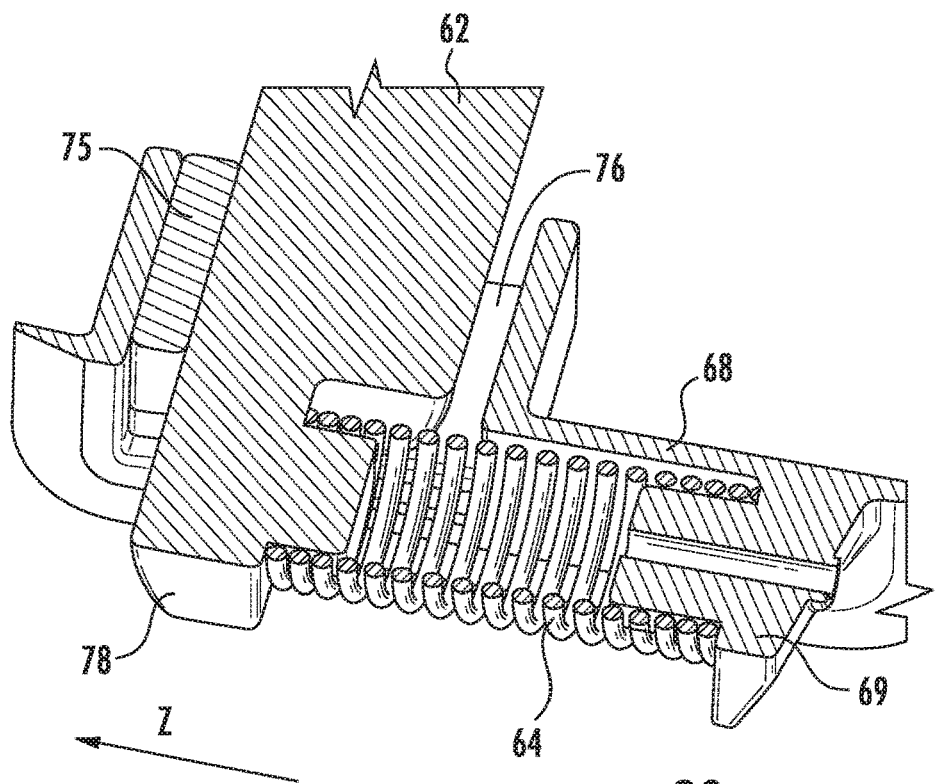
Figure 21:
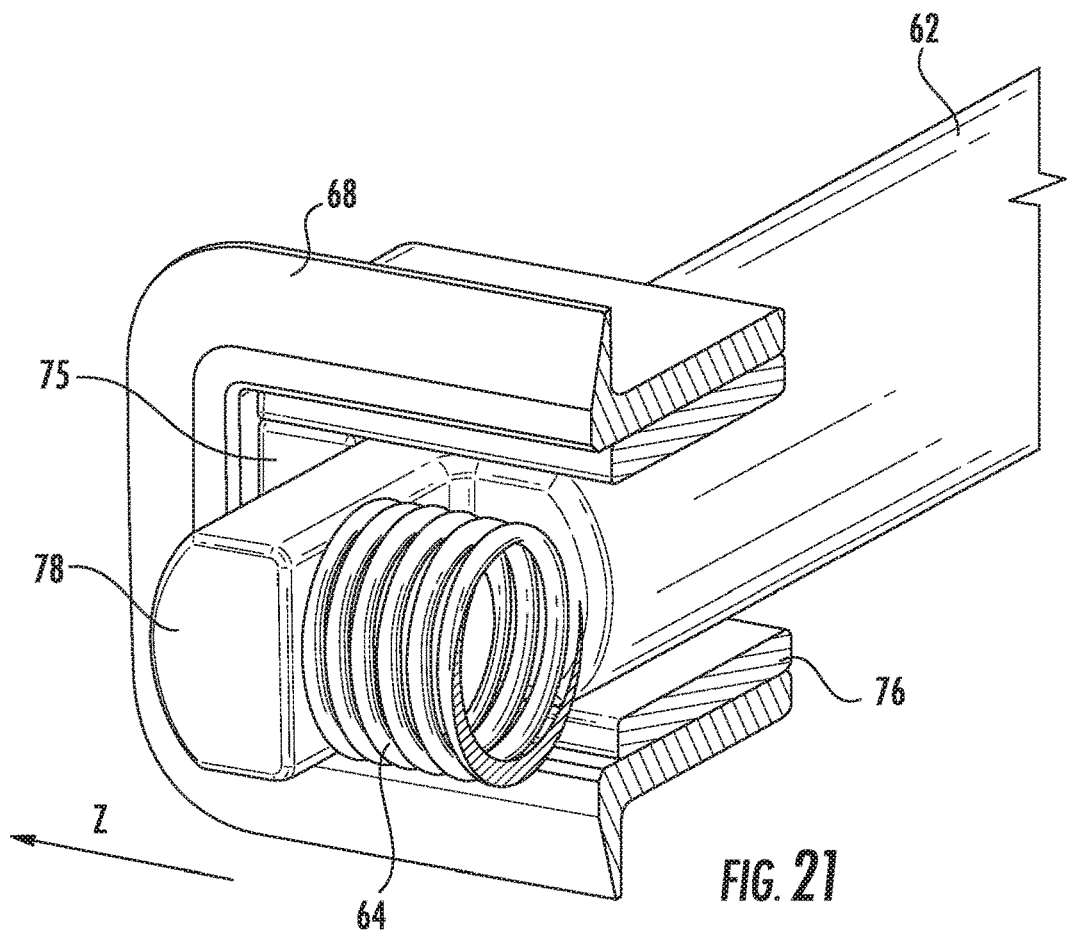

In some embodiments, as illustrated in FIGS. 5 and 6, the rotor blade assembly 20 for a wind turbine 10 can have a first blade segment 22 with a female structural member 70 defining an internal cavity 71. A second blade segment 24 can be connected to the first blade segment 22 at a chord-wise extending joint 25. The second blade segment 24 can have a male structural member 80 received within the internal cavity 71 of the female structural member 70 of the first blade segment 22. At least one floating connector 60 (see FIGS. 7-10) can have a biasing element 64 (see FIGS. 15 and 16) wherein the floating connector 60 is configured through the chord-wise extending joint 25 and positioned in at least one of a generally chord-wise direction 57 and a generally span-wise direction 58. The rotor blade assembly 20 can include at least one bushing housing 68 on the first blade segment 22 and/or the second blade segment 24 to promote assembly alignment and provide structural containment of the floating connectors 60. The first blade segment 22 and second blade segment 24 can be reversed to house the male structural member 80 and female structural member 70, respectively. Also, the rotor blade assembly 20 can be used in other types of blade joints such as overlapping beam joints.

The floating connector 60 alleviates loads from edgewise bending but the tip 42 still has to be restrained against the centrifugal loads and the reversing loads from gravity during wind turbine operation. As illustrated in FIGS. 18-21, the restraint can be a biasing element 64 as part of the floating connector 60 or positioned remote from the floating connector 60 between the first and second blade segments 22, 24, for example blade and tip.

FIGS. 14-16 illustrate an embodiment of a floating pin 62 removably installed in a floating connector 60. Bushings 66 installed as part of the floating connectors 60 on the female structural member 70 and the male structural member 80 contact the floating pin 62 at the female connector surface 72 and male connector surface 62, respectively. The floating pin 62 can have at least one pin projection 78 and at least one biasing element 64 configured to bias the bi-directional movement of the floating pin 62. The bushings 66 in a floating connector 60 can use a removable bearing 73 adjacent the bore hole 74 in the bushing 66. The removable bearing 73 can have at least one gravitational pad 75 and at least one pin slider pad 76. As illustrated in FIG. 16, the pin projection 78 can move in a preselected plane that can be generally parallel with the spanwise direction (Z-direction).

FIGS. 18-21 illustrate the floating pin 62 and pin projection 78 positioned inside a bushing housing 68. The bushing housing 68 can have a housing projection 69 positioned such that the biasing element 64 extends between the pin projection 78 and the housing projection 69. The housing projection 69 extends from a non-floating or fixed portion of the rotor blade assembly 20. The biasing element 64 can be at least one of a spring, one or more bellows, a flexible material, or combinations thereof and has the function of resisting the gravitational loads and to keep the pin projection 78 resting against the gravitational pad 75. The preload of the biasing element 64 can be adjusted by a bolt mechanism or other known preload adjusting devices. The pin slider pads 76 limit the movement of the floating pin 62 in the flap-wise direction while allowing bi-directional movement of the floating pin 62 in a preselected plane, such as the span-wise (Z) direction.

A method of connecting two adjoining blade segments can include the steps of inserting a second blade segment 24 comprising a male structural member 80 into a first blade segment 22 comprising a female structural member 70 at a chord-wise extending joint 25. Then aligning a plurality of bushings 66 attached to the first blade segment 22 and the second blade segment 24, the plurality of bushings 66 having at least one set of aligned bore holes 74 extending through a passageway in the chord-wise extending joint 25 in at least one of a generally chord-wise direction 57 and a generally span-wise direction 58. Then, removably seating at least one floating pin 62 through the at least one set of aligned bore holes 74 to configure at least one floating connector 60. The at least one floating pin 62 can be configured for only bi-directional movement, in a single preselected plane, within at least one bushing 66 of the plurality of bushings 66. Then, installing at least one biasing element 64 that is configured to restrain bi-directional movement of the at least one floating pin 62 within the at least one floating connector 60.

The method can also include the steps of nesting at least one set of the plurality of bushings 66 positioned in respective male 80 and female 70 structural members such that relative rotational motion occurs between the at least one set of nested bushings 66. Then, bi-directionally moving the at least one floating pin 62 wherein the single preselected plane extends in only a span-wise direction 58.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
   a first blade segment comprising a female structural member defining an internal cavity;
   a second blade segment connected to the first blade segment at a chord-wise extending joint, the second blade segment comprising a male structural member, the male structural member received within the internal cavity of the female structural member of the first blade segment; and,
   at least one floating connector joining the first and second blade segments together, the at least one floating connector positioned in at least one of a chord-wise direction and a span-wise direction, the at least one floating connector comprising a floating pin that permits a movement of the second blade segment relative to the first blade segment, the floating connector further comprising a biasing element configured to restrain the movement permitted by the floating pin within the floating connector to a bi-directional movement in a single preselected plane, the bi-directional movement comprising at least two of a flap-wise direction, a chord-wise direction, or a span-wise direction.

2. The rotor blade assembly of claim 1, further comprising at least two chord-wise extending joints in a modular blade configuration.

3. The rotor blade assembly of claim 1, wherein the first blade segment further comprises at least one bushing housing.

4. The rotor blade assembly of claim 1, further comprising one floating connector positioned in a chord-wise direction and one floating connector positioned in a span-wise direction.

5. The rotor blade assembly of claim 1, further comprising two parallel floating connectors positioned in a chord-wise direction.

6. The rotor blade assembly of claim 1, wherein the at least one floating connector further comprises:
   a plurality of bushings attached to the first and second blade segments, the plurality of bushings comprising at least one set of aligned bore holes extending through a passageway in the chord-wise extending joint, wherein the at least one floating pin is removably seated through the at least one set of aligned bore holes, the at least one floating pin configured for only bi-directional movement, in a single preselected plane, within at least one bushing of the plurality of bushings.

7. The rotor blade assembly of claim 6, wherein the preselected plane is parallel with the span-wise direction.

8. The rotor blade assembly of claim 1, wherein the biasing element comprises at least one of a spring, one or more bellows, a flexible material, or combinations thereof.

9. A floating connector for a rotor blade assembly, comprising:
   a plurality of bushings attached to a first blade segment and a second blade segment, the plurality of bushings comprising at least one set of aligned bore holes extending through a passageway in a chord-wise extending joint; and,
   at least one floating pin removably seated through the at least one set of aligned bore holes, the at least one floating pin permitting movement of the second blade segment relative to the first blade segment, wherein the at least one floating pin further comprises at least one pin projection and at least one biasing element configured to restrain the movement permitted by the at least one floating pin to a bi-directional movement in a single preselected plane, the bi-directional movement comprising at least two of a flap-wise direction, a chord-wise direction, or a span-wise direction.

10. The floating connector of claim 9, wherein the plurality of bushings and the at least one floating pin are cylindrical.

11. The floating connector of claim 9, wherein the plurality of bushings further comprises at least one removable bearing adjacent the aligned bore holes.

12. The floating connector of claim 11, wherein the removable bearing further comprises at least one gravitational pad and at least one pin slider pad.

13. The floating connector of claim 9, wherein the preselected plane is parallel with a spanwise direction of a rotor blade assembly.

14. The floating connector of claim 13, wherein the rotor blade assembly further comprises at least one bushing housing.

15. The floating connector of claim 14, wherein the bushing housing further comprises a housing projection, the at least one biasing element extending between at least one pin projection and the housing projection.

16. The floating connector of claim 9, wherein the at least one biasing element comprises at least one of a spring, one or more bellows, a flexible material, or combinations thereof.

17. A method of connecting two adjoining blade segments, comprising:
   inserting a second blade segment comprising a male structural member into a first blade segment comprising a female structural member at a chord-wise extending joint;
   aligning a plurality of bushings attached to the first blade segment and the second blade segment, the plurality of bushings comprising at least one set of aligned bore holes extending through a passageway in the chord-wise extending joint in at least one of a chord-wise direction and a span-wise direction;
   removably seating at least one floating pin through the at least one set of aligned bore holes to configure at least one floating connector, the at least one floating pin being able to move within the at least one set of aligned bore holes so as to permit a movement of the second blade segment relative to the first blade segment; and, installing at least one biasing element to restrain the movement permitted by the at least one floating pin within the at least one floating connector to a bi-directional movement in a single preselected plane, the bi-directional movement comprising at least two of a flap-wise direction, a chord-wise direction, or a span-wise direction.

18. The method of claim 17, further comprising:
nesting at least one set of the plurality of bushings positioned in respective male and female structural members such that relative rotational motion occurs between the at least one set of nested bushings.

19. The method of claim 17,
wherein the single preselected plane extends in only the span-wise direction.

* * * * *